United States Patent [19]
Worth

[11] Patent Number: 5,881,225
[45] Date of Patent: Mar. 9, 1999

[54] SECURITY MONITOR FOR CONTROLLING FUNCTIONAL ACCESS TO A COMPUTER SYSTEM

[75] Inventor: Erik K. Worth, Milpitas, Calif.

[73] Assignee: Araxsys, Inc., Redwood City, Calif.

[21] Appl. No.: 842,575

[22] Filed: Apr. 14, 1997

[51] Int. Cl.$^6$ .............................. G06F 12/14; H04L 9/32
[52] U.S. Cl. .............. 395/186; 395/187.01; 395/188.01; 380/4; 380/25
[58] Field of Search ............... 395/186, 187.01, 395/188.01; 380/4, 25

[56] References Cited

U.S. PATENT DOCUMENTS

| | | | |
|---|---|---|---|
| 5,263,167 | 11/1993 | Conner, Jr. et al. | 704/4 |
| 5,295,266 | 3/1994 | Hinsley et al. | 395/671 |
| 5,748,890 | 5/1998 | Goldberg et al. | 395/188.01 |
| 5,752,242 | 5/1998 | Havens | 703/3 |

*Primary Examiner*—Ly Hua
*Attorney, Agent, or Firm*—D'Alessandro & Ritchie

[57] ABSTRACT

Security functions for a computer system are controlled by a security monitor. A user desiring access to the system inputs a user identification and password combination, and a role the user to assume is selected from among one or more roles defined in the system. Upon being validated as an authorized user performing a particular role, the user is then authorized to perform certain functions and tasks specifically and to see information associated with that role (and optimally the work group the user is assigned). For some users, no role or a "null" roll is chosen, and authorization for certain functions and tasks is accomplished due to that particular user having been predefined by an administrator as being allowed to perform those functions and tasks, usually due to the predefined privileges associated with the work group(s) to which the user belongs.

12 Claims, 3 Drawing Sheets

SECURITY MONITOR FOR CONTROLLING FUNCTIONAL ACCESS TO A COMPUTER SYSTEM

BACKGROUND OF THE INVENTION

1. Field of the Invention

The present invention relates to a method for authorizing the execution of processes in a computer system. More particularly, the present invention relates to a method for determining whether a user is authorized to execute a particular process or access particular data in a computer system by determining whether that user is a member of an authorized group or has assumed an authorized role.

2. The Background Art

As computer systems have become more complex and more sophisticated, the need to control access to these systems and to control the execution of processes within these systems has significantly increased.

In order to gain access to a computer system, a user typically enters a user identification and a password. This information is compared against previously stored authorization information, and if the user-entered data matches the stored data, the user is granted access to the system.

Following a user being granted access to the system, system security is often focused on granting or denying the user access to directories and files. One example of such a system is the UNIX® operating system.

At the time a user is defined by a system administrator of the UNIX®-based system, the user is assigned a unique user ID and a group ID. Group ID's are often assigned based on common characteristics associated with users. For instance, members of a research group might all be assigned a common group identifier. The user ID and group ID are used when verifying whether a user is authorized to view the contents of a directory, edit a file within a directory, or execute a program.

Under UNIX®, after having passed through the initial access checkpoint using an authorized user ID and password, the user's access to files and programs is based upon the results of a comparison performed by the operating system between the settings contained in a "privilege word" and the user and group ID's associated with the requesting user. Every file and directory in the system has a distinct privilege word associated with it, attributes of which are set by the owner of the file either at the time the file is created, or at any other convenient time.

FIG. 1 is a diagram depicting a typical file access privilege word in a UNIX-based operating system.

Referring to FIG. 1, a file access privilege word 10 shows three 3-bit segments, one each associated with owner 12, group 14, and public 16 access to a file or directory. Read bit 18, if set, grants read access to the owner 12, group 14, or public 16, depending on which segment the read bit 18 is contained within. Correspondingly, write bit 20 and execute bit 22 controls write and execute authority to owner 12, group 14, or the public 16, depending on whether that particular bit is set, and which segment contains the write bit 20 or execute bit 22 in question.

For instance, the bit pattern "110100000" shown in FIG. 1 allows the owner to read or write to the file because read bit 18 and write bit 20 are both set to a "1" in the segment associated with owner 12. Further, because read bit 18 is set to a "1" in the segment associated with group 14, any member of the group owning the file may read the file. Since no bits are set in the segment associated with public 16, no public access if allowed.

The protection system depicted herein is also used to protect the file system when accessed remotely. Users logging into the system from remote locations are treated in the same manner as those operating from local locations. Thus, the read-write-execute privilege word is utilized network-wide.

While this type of protection which uses a privilege word is suitable for its intended use, it suffers from a lack of flexibility. As organizations become more dependent upon computers for their operations, many different types of users are using these computer systems, each with differing access requirements. It would therefore be beneficial to provide a method for determining a user's authority to execute certain processes in a computer system wherein each user is given a level of access to the system commensurate with the position that user holds within the organization.

A second deficiency in the prior art system described above is that a user may only assume one role, that of a computer user. Access rights for this user is constant. That is, the user receives the same access rights every time the user accesses the system, regardless of the function that user is performing at any given time. For instance, a secretary editing a document would have the same privileges as when that secretary is accessing sensitive information stored in a database. This may result in unintended access and modification of data. It would therefore be beneficial to provide a system wherein a user may assume any one several possible roles, where the role the user chooses upon any given login corresponds to the particular function that user is performing during that particular login session.

A third deficiency in the prior art system described above is that no provision is made for temporary access to files and programs. A user of the prior art system is typically given access by a system administrator, and that access continues until the system administrator manually removes the user from the user list. It would therefore be beneficial to provide a system wherein access by a user to files or program operations may be time limited, thus terminating those access rights automatically at a time previously determined and set by a security administrator.

OBJECTS AND ADVANTAGES OF THE INVENTION

It is an object and advantage of the present invention to provide a method for determining a user's authority to execute certain processes in a computer system wherein each user is given access to areas of the system based upon the department or groups in which the user is a member.

It is a second object and advantage of the present invention to provide a system wherein a user may assume any one several possible roles, where the role the user chooses upon any given login corresponds to the particular function that user is performing during that particular login session.

It is a third object and advantage of the present invention to provide a system wherein access by a user to files or program operations may be time limited, thus terminating those access rights automatically at a time previously determined and set by a security administrator.

It is yet another object and advantage of the present invention to provide a system wherein the number of users, groups, or roles performing particular tasks at a given time is limited to a predefined number.

These and many other objects and advantages of the present invention will become apparent to those of ordinary skill in the art from a consideration of the drawings and ensuing description of the invention.

SUMMARY OF THE INVENTION

In a first aspect of the present invention, users are authorized access to a computer system by providing a proper user name, a password, and a desired role from among those authorized for that user. Upon being authorized with initial access to the computer system, or simultaneously therewith, a subprogram collects information relating to the user such as which role that user is assuming during that login session, and which group or groups the user belongs. That information is then passed to a security monitor program. When a process or application program is requested by a user to be executed, or when a user requests access to sensitive data, the security monitor is queried and responds with information indicative of whether access should be granted, based on the authorization information passed to it soon after the user logged into the system.

In a second aspect of the present invention, a user of the computer system may be a member of one or more work groups or security groups. These groups may be stand-alone, having no members other than users or roles. Alternatively, groups may themselves contain groups, thus defining hierarchical access to data and processes. A member of a group may inherit the characteristics and authorizations of that group. A user's access to perform certain functions may be limited by which of several roles the user is assuming at any given time.

In a third aspect of the present invention, groups may be set up for providing temporary access to the computer system. Upon the expiration of a predetermined period of time set by a supervising user such as a security administrator, the group becomes inactive for further access, and may not perform any of the functions or access any data previously authorized.

FIG., 2B is a flow chart depicting steps in the method of the present invention.

Figure 1:
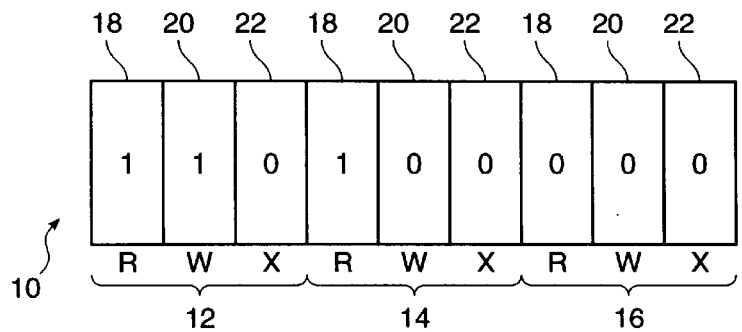
FIG. 1 is a diagram depicting a typical privilege word in a UNIX-based operating system.
Figure 2A:
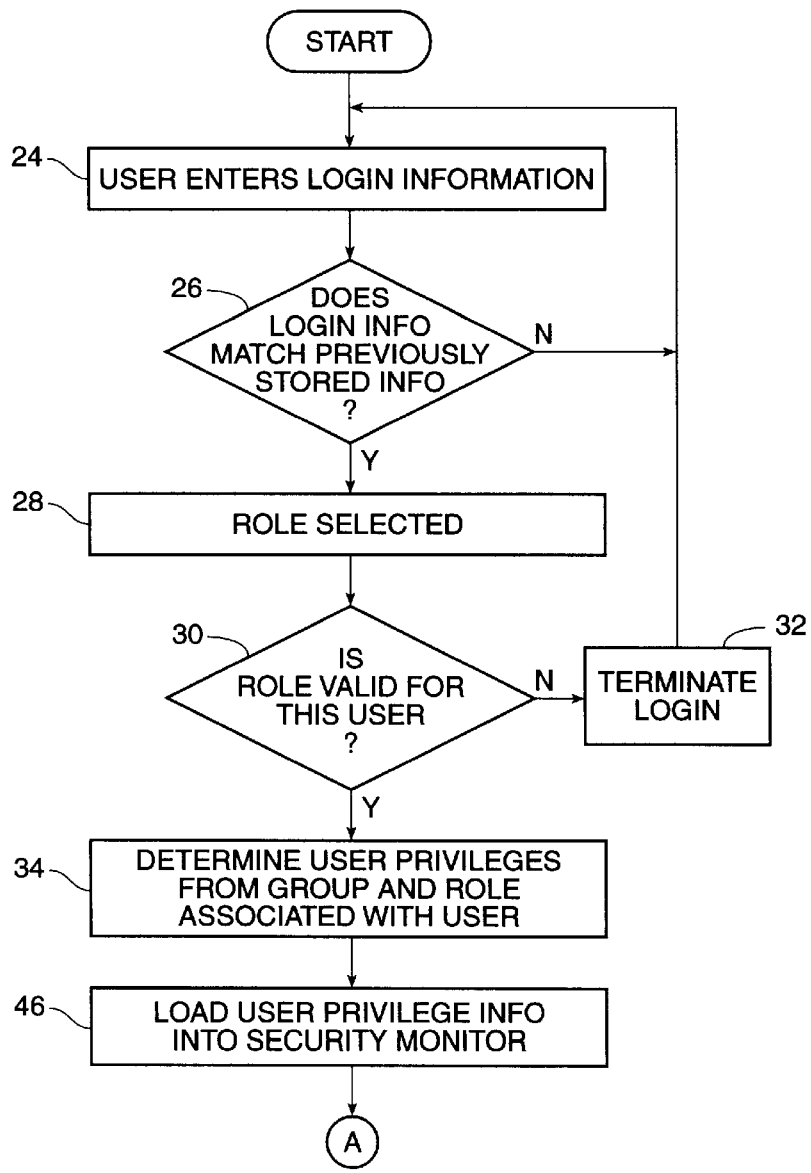
FIG. 2A is a flow chart depicting steps in the method of the present invention.
Figure 2B:
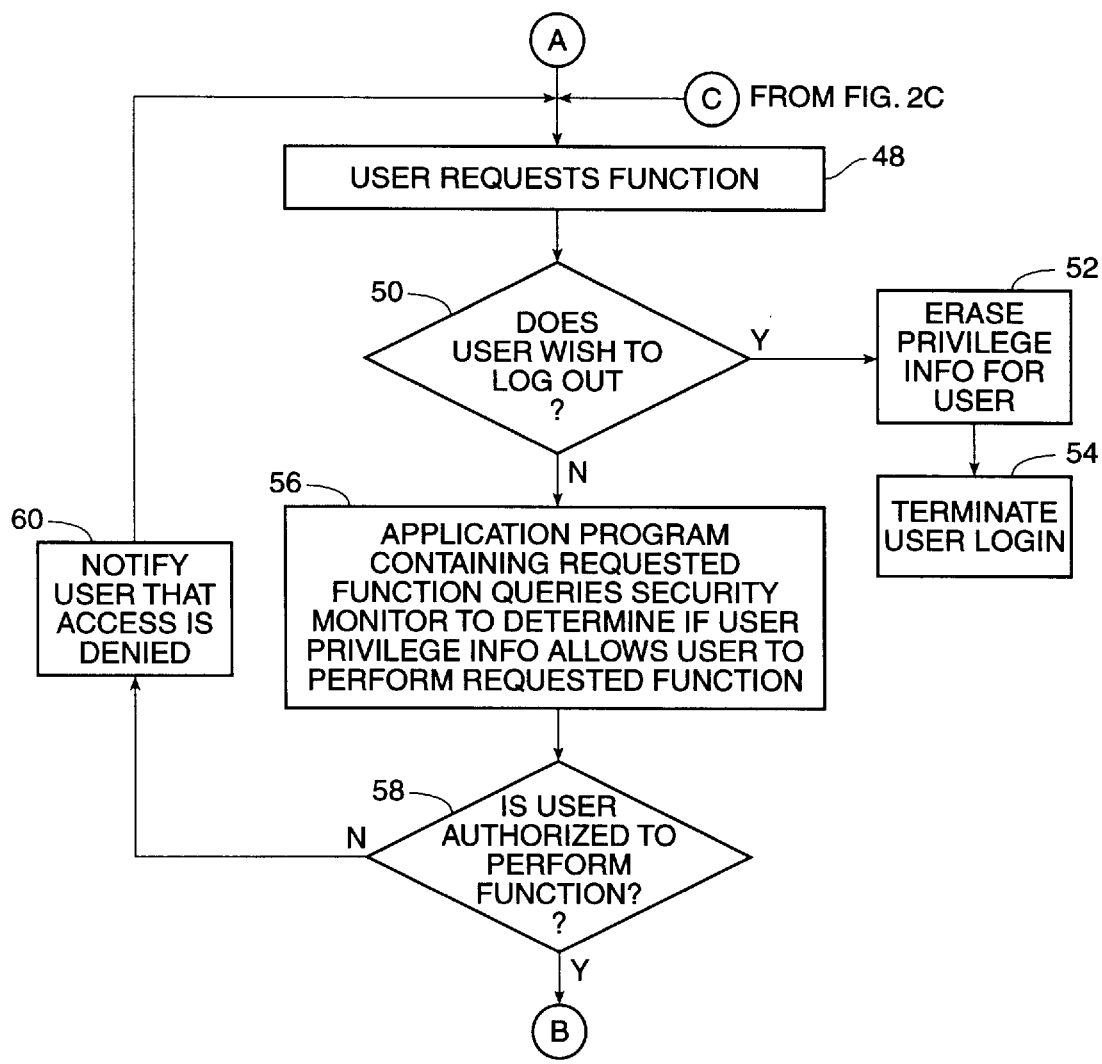
Figure 2C:
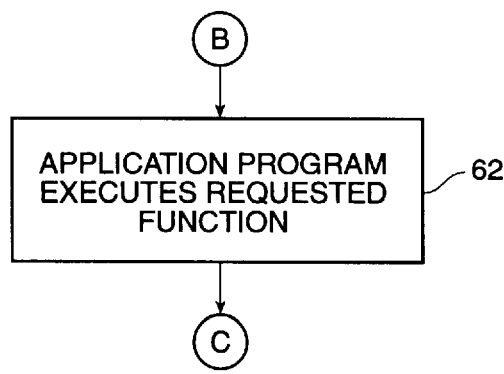

FIG. 2C is a flow chart depicting steps in the method of the present invention.

Figure 3:
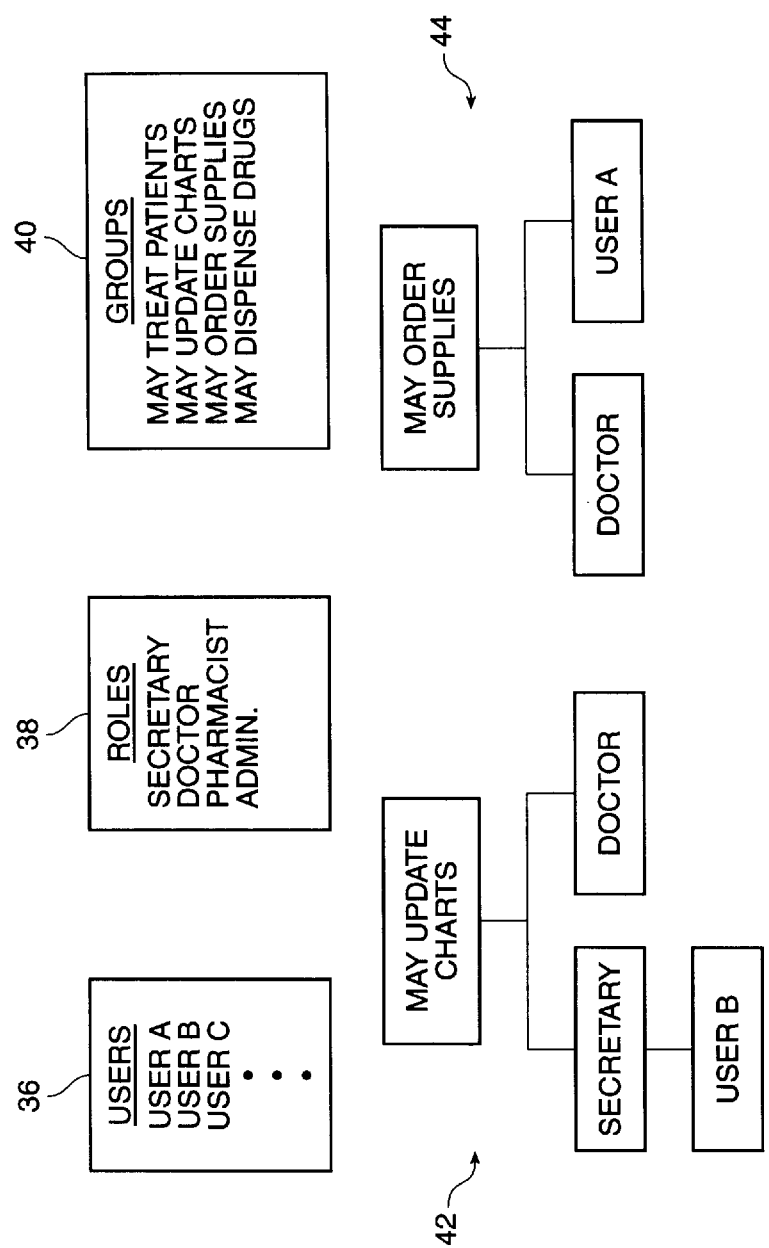

FIG. 3 is a diagram showing one possible arrangement of users, roles, and groups used in a presently preferred embodiment of the present invention.

DESCRIPTION OF THE PREFERRED EMBODIMENT

Those of ordinary skill in the art will realize that the following description of the present invention is illustrative only and is not intended to be in any way limiting. Other embodiments of the invention will readily suggest themselves to such skilled persons from an examination of the within disclosure.

Specifically, the embodiments described herein relate to a Health Care. Management computer system. However, the system described hereing is equally applicable to any enterprise-wide computer system, and is usable with corporate computer systems, military computer systems, telephone company computer systems, and the like.

FIG. 2A is a flow chart depicting steps in the method of the present invention.

Referring to FIG. 2A, in a step 24, a user of the system enters login information into the system through an input means provided for that purpose. This login information preferably comprises a unique user ID assigned to the user, and a password either assigned to or chosen by that user. Although a unique user ID is preferred due to the ease of which a particular user may be identified using a unique name, an alternative embodiment may include the user being identified by department and password. In this instance, the particular individual logging in to the system might be identified by which particular department and password combination is supplied. Other systems are well known to those of ordinary skill in the art.

Once the login information is entered, the login process proceeds with step 26 wherein the information is compared by the system to previously stored authorization information within the system. If the information the user entered does not match information previously stored, the login process is terminated or reset, and preferably begins again at step 24.

If, however, the login information entered by the user matches information previously stored, the user is determined to be a valid user, and, in step 28, the user then is given the opportunity to input a role that the user desires to assume for this login session.

It is preferred that roles in the system be defined along functional lines. For instance, in a presently preferred embodiment of the present invention, the system is used in the medical industry. Thus, roles such as doctor, pharmacist, janitor, etc. are included in such a system. Roles may be added and deleted by a security administrator as required in order to keep the system current.

It should be noted that although it is preferred that a user input the desired role in order to provide flexibility to the system, it may be more desirable in some situations to predetermine the role a person will assume for a particular session, based upon which terminal, personal computer, or other entry point into the computer system the user is using at that particular time. It may also be desirable at times to restrict a user from using a particular role unless that user is at a particular terminal.

For instance, in sensitive situations, it may be desired that the role of system administrator only be performed in a secure area. In this case, the system would be set up to restrict a user from assuming the role of system administrator unless that user is using a particular terminal. Identifying a user's particular terminal is well-known to those of ordinary skill in the art, and therefore will not be described herein.

Following the user entering a desired role to assume, the system, in step 30, verifies whether the user has entered a role which has been authorized for this particular user. Because it is important that a user not be allowed to assume a role with which the user is unfamiliar, or which has not been authorized by the security administrator who set up the user profile, it is necessary to terminate the login process, in step 32, if a user inputs the wrong role information, or if the user is at the wrong terminal, or in some way the selected role is unavailable to the user under the circumstances. In this case, the login process would then preferably proceed again with step 24.

In an alternate embodiment, a list of roles available to a user could be displayed, and the role chosen from that list. A second alternative embodiment includes allowing the user to enter the system without a role being assigned, or with a "null" role being assigned. In this case, the user would be limited to general functions not requiring special access to files or processes.

If, in step 32, it is determined that the desired role is authorized for that user, the system now determines, in step 34, what privileges the user should have for that particular login session. Privileges are awarded based upon which role the user is assigned during the session, and to which group or groups the user belongs.

Turning now to the possible hierarchical arrangement of users, groups, and roles which determine privileges, FIG. 3 is a diagram showing one possible arrangement of users, roles, and groups used in a presently preferred embodiment of the present invention. FIG. 3 depicts a user list 36, a list of roles 38, and a list of possible groups 40. A presently preferred embodiment of the present invention gives the security administrator total freedom to design the user, role, group heirarchy in such a way as to give user the exact level of authority required to perform any task.

In a presently preferred embodiment of the present invention, when a user is created in the system, or later at a convenient time, the security administrator may assign a user into one or more groups, with one group being the primary work group. A group is described as the department or departments a particular user works with in the performance of their position within the organization. In an alternative embodiment, a group may be defined differently, along other common characteristics. For instance, users from different departments who perform the same or similar research may be defined as residing in the same group.

A group may itself be within a group. Thus, a group "may print reports" may contain the role "secretary" within it, thus giving all persons logged into the system who are assuming the current role of secretary the power to print reports. The number of groups the administrator may create is virtually unlimited, and the number of groups which may be contained within a higher group is unlimited, save that a group may not contain itself or any other group above it in the hierarchy or groups. Thus, recursive privilege paths are not allowed. Groups may contain individual users, roles, and as stated earlier, other groups.

At the time the administrator defines the user, or at a later convenient time, the possible roles available to that user are listed and stored. The administrator may pick from a master list of available roles within the computer system, or may create a new role not currently available. In a presently preferred embodiment of the present invention, a role is defined along functional lines, such as relating to a position the person is assigned within an organization.

Thus, a user "A" who prints reports and performs other administrative tasks may be allowed the role of secretary. In a medical environment, user "A" may also be allowed to assume the role of doctor, if that role of doctor is required in order for the secretary to be able to update charts according to the wishes of her supervisor, the physician. More likely, however, the system would contain a group "may update charts" which user "A" would be a member of, thus allowing user "A" to update charts without also gaining privileges to dispense medicine, assign treatment plans, and other privileges associated with doctors.

At the same time a new group is created, or at any other convenient time, system administrator may decide to limit the period of time the group remains active. In this case, a doctor who is temporarily assuming the duties of another physician may be added to a temporary group which authorizes those duties, and which expires at a predetermined time.

The system administrator may also determine that a maximum limited number of users should be able to perform a task at any given time, Thus, the administrator may limit the number of users allowed in a role or in a group at any given time.

It is important to keep in mind when viewing FIG. 3 that it is the hierarchical arrangement of the groups which gives a user different privileges. For instance, in tree 42 a user B is a member of group "secretary". The group "secretary" is a member of the group that may update charts. Subgroups inherit the properties of the groups of which they are a member. Therefore, User B will be granted whatever privileges secretaries are granted. At least one of those privileges is the power to update charts. Thus, when user B logs into the system and has been validated, the system, in step 34 of FIG. 2A, will collect information which grants user B the power to update charts.

Those of ordinary skill in the art will readily recognize that there will likely be several members of the group "secretary". Thus, those several members, under this scenario, would be able to update charts. If there were secretaries which you don't wish to give that power, you might specify the particular users to give that power in a separate group, or alternatively list them individually in the group "may update charts".

In tree 44, we have shown a scenario where all doctors may order supplies, and user A may also order supplies. User A is not a doctor, and therefore was added individually to the group in order to be granted the privilege of ordering supplies by the system.

Returning to FIG. 2A at step 34, we see that the system now determines the privileges associated with the user. This is accomplished by the system identifying all of the groups the user is a member through the hierarchy as just described. For our fictitious user B in FIG. 3, the system would list "may update charts", and "secretary" as privileges for that user.

Although the presently preferred embodiment of the present invention allows a user to assume only one role per login session, an alternate embodiment is contemplated wherein a user is allowed to select any other role authorized for that user, during the current login session, without logging off the system. In this embodiment, when the user selects a new role, the system reverifies that the new role is authorized for that user, and if so, the system performs step 34 again, thus determining the new privileges the user has, using the newly selected role.

In step 46, the list of privileges developed for the user is now loaded into the security monitor program. The security monitor is a sub-program within the system, which when queried by an application program, will return whether a user is authorized to perform a particular function, or view particular data.

FIG., 2B is a flow chart depicting steps in the method of the present invention.

Referring now to FIG. 2B, in step 48, the user may choose one or more functions to perform. These functions may be chosen from a user prompt which can be within a file manager, or from a list of choices in a menu-based display, or any other suitable method of choosing application programs for execution.

In step 50, the system verifies whether the user requested to be logged off the system. If yes, the system erases the active privilege information from the security monitor in step 52, and then proceeds with step 54 where the user's on system presence is terminated.

If, in step 50 it is determined that a logoff was not requested, the application program containing the desired function is initiated at which time the application program interrogates the security monitor to determine if the user has the authority to perform the requested function.

If in step 58, it is determined that the user is not authorized to perform the requested function, the system notifies the user that the access is denied in step 60, and then proceeds again with step 48. In an alternative embodiment where a menu of functions authorized to be performed by that user is presented on a computer display for the user to choose, the unauthorized choices would not be displayed, or would be unselectable by the user. In this embodiment, step 58 would not be required, since any function chosen by the user would be authorized. Step 60 would also not be required, since all functions displayed to the user would be authorized.

FIG., 2C is a flow chart depicting steps in the method of the present invention.

Referring to FIG. 2C, if in step 58, the user is authorized to perform the desired function, step 62 proceeds when the application program containing the requested function executes that function for the user.

Following execution of the requested function for the user, the system then proceeds with step 48 where the user is again allowed to choose a function to execute.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. In a computer system including an input device, a method for authorizing the activities of a user comprising the steps of:

accepting from the user user-specific information entered into said computer system using the input device;

comparing said user-specific information against previously stored authorization information and permitting the user to access the computer system if and only if said user-specific information matches said previously stored authorization information;

selecting a role which the user will assume;

determining the privileges to which the user is authorized, based upon said user-specific information and said selected role;

passing data corresponding to said privileges to a security monitor, said security monitor being queryable from application programs so that upon such query an application program may obtain information defining privileges to which the user is authorized.

2. A method according to claim 1 wherein said selecting step includes the step of listing for the user a selection of authorized roles that said user may assume.

3. A method according to claim 1 wherein said determining step further includes the step of determining the privileges to which said user is authorized, based upon the groups in which said user is a member.

4. A method according to claim 1 wherein said role is defined as the title of a position of functional responsibility.

5. A method according to claim 4 wherein said role includes a role selected from the following: Administrator, Nurse, Physician, Cardiologist, Orderly, Psychiatrist, Psychologist.

6. In a computer system including an input device, a method for authorizing the activities of a user comprising the steps of:

accepting from the user user-specific information entered into said computer system using the input device;

comparing said user-specific information against previously stored authorization information and permitting the user to access the computer system if and only if said user-specific information matches said previously stored authorization information;

determining privileges to which the user is authorized, based upon said user-specific information and previously stored group information defining with which the user is associated;

passing data corresponding to said authorized privileges to a security monitor, said security monitor being queryable from application programs so that upon such query an application program may obtain information defining said authorized privileges.

7. In a computer system including an input device, a method for authorizing the activities of a user comprising the steps of:

accepting from the user user-specific information entered into said computer system using the input device;

comparing said user-specific information against previously stored authorization information and permitting the user to access the computer system if and only if said user specific information matches said previously stored authorization information;

receiving a user specified role;

determining privileges assigned to the user by said user-specific information and said user specified role;

receiving a requested function query when the user seeks to perform a function, said requested function query generated by an application program providing said function;

responding to said requested function query by determining whether the user is authorized to perform said function through said application program;

authorizing said application program to provide said function if said function is found authorized in said step of responding; and denying authorization to said application program if said function is found not authorized in said step of responding.

8. The method of claim 7, further including the steps of:

loading information pertaining to said privileges into a security monitor; and using said security monitor to perform said steps of determining whether the user is authorized to perform said function through said application program, authorizing said application program to provide said function if said function is found authorized in said step of responding, and denying authorization to said application program if said function is found not authorized in said step of responding.

9. A method according to claim 7 further including a step of listing for the user a selection of authorized roles that said user may assume.

10. A method according to claim 7 wherein said determining step further includes the step of determining the privileges to which said user is authorized, based upon the groups in which said user is a member.

11. A method according to claim 7 wherein said role is defined as a title of a position of functional responsibility.

12. A method according to claim 11 wherein said role includes a role selected from the following: Administrator, Nurse, Physician, Cardiologist, Orderly, Psychiatrist, Psychologist.

* * * * *